(12) United States Patent
Kodeswaran et al.

(10) Patent No.: US 10,397,761 B2
(45) Date of Patent: Aug. 27, 2019

(54) REDUCING MAINTENANCE OVERHEAD AND COSTS IN SMART ENVIRONMENTS

(71) Applicant: International Business Machines Corporation, Armonk, NY (US)

(72) Inventors: Palanivel A. Kodeswaran, Bangalore (IN); Ravindranath Kokku, Hyderabad (IN); Sayandeep Sen, Bangalore (IN); Mudhakar Srivatsa, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 898 days.

(21) Appl. No.: 14/802,171

(22) Filed: Jul. 17, 2015

(65) Prior Publication Data
US 2017/0017932 A1    Jan. 19, 2017

(51) Int. Cl.
*H04W 4/70* (2018.01)
*G06Q 10/00* (2012.01)
(Continued)

(52) U.S. Cl.
CPC .............. *H04W 4/70* (2018.02); *G06F 9/541* (2013.01); *G06F 21/50* (2013.01); *G06N 5/02* (2013.01);
(Continued)

(58) Field of Classification Search
None
See application file for complete search history.

(56) References Cited

U.S. PATENT DOCUMENTS 8,441,371 B2   5/2013  Kuris et al.
9,224,096 B2 * 12/2015  Oppenheimer ......... G06F 21/50
(Continued)

FOREIGN PATENT DOCUMENTS

CN          103024814 A      4/2013
WO       WO2006133340 A2   12/2006

OTHER PUBLICATIONS

Ni Q, García Hernando AB, De la Cruz IP. The Elderly's Independent Living in Smart Homes: A Characterization of Activities and Sensing Infrastructure Survey to Facilitate Services Development. Sensors. 2015; 15(5):11312-11362.*
(Continued)

*Primary Examiner* — Gurkanwaljit Singh
(74) *Attorney, Agent, or Firm* — Ference & Associates LLC

(57) ABSTRACT

Methods and arrangements identifying sensors deployed in an internet of things to assist in determining a need for sensors. A plurality of sensors are connected with. A set of rules are inputted to at least one processor, wherein the rules associate particular sensors within the plurality of sensors with tasks associated with a plurality of activities of daily living. A quantitative utility value is assigned to each of the activities of daily living within the plurality of activities of daily living. The quantitative utility value of each of the activities of daily living and the tasks associated with the activities of daily living are utilized to identify those sensors within the plurality of sensors needed to identify each of the activities of daily living above a predetermined quantitative value. Other variants and embodiments are broadly contemplated herein.

17 Claims, 3 Drawing Sheets

(51) Int. Cl.
   *G06Q 10/06*   (2012.01)
   *G06F 9/54*    (2006.01)
   *H04L 29/06*   (2006.01)
   *G06N 5/02*    (2006.01)
   *G06F 21/50*   (2013.01)

(52) U.S. Cl.
   CPC ....... *G06Q 10/06315* (2013.01); *G06Q 10/20* (2013.01); *H04L 29/06* (2013.01)

(56) References Cited

U.S. PATENT DOCUMENTS

| | | | | |
|---|---|---|---|---|
| 9,986,411 | B1* | 5/2018 | Stamatakis | H04W 8/005 |
| 2008/0256445 | A1* | 10/2008 | Olch | G06F 19/00 |
| | | | | 715/700 |
| 2014/0089243 | A1* | 3/2014 | Oppenheimer | G06F 21/50 |
| | | | | 706/46 |
| 2016/0088049 | A1* | 3/2016 | Seed | H04W 4/70 |
| | | | | 709/203 |
| 2016/0241988 | A1* | 8/2016 | Slevin | H04W 4/70 |

OTHER PUBLICATIONS

X. Long, B. Yin and R. M. Aarts, "Single-accelerometer-based daily physical activity classification," 2009 Annual International Conference of the IEEE Engineering in Medicine and Biology Society, Minneapolis, MN, 2009, pp. 6107-6110.*

Bose, R. et al., "Distributed mechanisms for enabling virtual sensors in service oriented intelligent environments", 4th International Conference on Intelligent Environments (2008 IET), University of Washington, Seattle, WA, USA, Jul. 21-22, 2008, 9 pages.

Nugent, Chris D., et al., "Assessing the Impact of Individual Sensor Reliability Within Smart Living Environments", 4th IEEE Conference on Automation Science and Engineering, Key Bridge Marriott, Washington D.C., USA, Aug. 23-26, 2008, 6 pages, IEEE Digital Library.

Kapitanova, Krasimira, et al., "Being Smart About Failures: Assessing Repairs in Smart Homes", UbiComp '12, Pittsburgh, PA, USA, Sep. 5-8, 2012, 10 pages, ACM Digital Library.

* cited by examiner

REDUCING MAINTENANCE OVERHEAD AND COSTS IN SMART ENVIRONMENTS

BACKGROUND

The Internet of Things (IOT), as generally known, has significant practical implications in many everyday settings. Consumers and others can benefit from devices (e.g., home-based appliances and items such as refrigerators, air conditioners, televisions, lights and lamps, etc.) that may have sensing, communication, and actuation capabilities to reach a desired state. The actuation may be partly or fully automated, and can serve a consumer (or benefit from his/her input) from a nearby or remote position.

In some IOT settings such as smart homes, it becomes especially important to take into consideration "Activities of Daily Living" (ADLs) that may influence operation of any and all sensors and other components. For instance, an IOT setting may be particularly well suited to tracking the ADLs of individuals of limited mobility or with a given medical condition, wherein monitoring such activities may be crucial towards determining if such individuals are functioning adequately or otherwise may be in need of assistance. One or more malfunctioning sensors can lead to false, misleading or incomplete data in such a regard, while it may well not be cost-effective to replicate sensors in every location in the IOT setting at hand.

BRIEF SUMMARY

In summary, one aspect of the invention provides a method of identifying sensors deployed in an internet of things to assist in determining a need for sensors, the method comprising: utilizing at least one processor to execute computer code that performs the steps of: connecting with a plurality of sensors; inputting to the at least one processor a set of rules, wherein the rules associate particular sensors within the plurality of sensors with tasks associated with a plurality of activities of daily living; assigning a quantitative utility value to each of the activities of daily living within the plurality of activities of daily living; and employing the quantitative utility value of each of the activities of daily living and the tasks associated with the activities of daily living to identify those sensors within the plurality of sensors needed to identify each of the activities of daily living above a predetermined quantitative value.

Another aspect of the invention provides an apparatus for identifying sensors deployed in an internet of things to assist in determining a need for sensors, the apparatus comprising: at least one processor; and a computer readable storage medium having computer readable program code embodied therewith and executable by the at least one processor, the computer readable program code comprising: computer readable program code that connects with a plurality of sensors; computer readable program code that inputs to the at least one processor a set of rules, wherein the rules associate particular sensors within the plurality of sensors with tasks associated with a plurality of activities of daily living; computer readable program code that assigns a quantitative utility value to each of the activities of daily living within the plurality of activities of daily living; and computer readable program code that employs the quantitative utility value of each of the activities of daily living and the tasks associated with the activities of daily living to identify those sensors within the plurality of sensors needed to identify each of the activities of daily living above a predetermined quantitative value.

An additional aspect of the invention provides a computer program product for identifying sensors deployed in an internet of things to assist in determining a need for sensors, the computer program product comprising: a computer readable storage medium having computer readable program code embodied therewith, the computer readable program code comprising: computer readable program code that connects with a plurality of sensors; computer readable program code that inputs to the at least one processor a set of rules, wherein the rules associate particular sensors within the plurality of sensors with tasks associated with a plurality of activities of daily living; computer readable program code that assigns a quantitative utility value to each of the activities of daily living within the plurality of activities of daily living; and computer readable program code that employs the quantitative utility value of each of the activities of daily living and the tasks associated with the activities of daily living to identify those sensors within the plurality of sensors needed to identify each of the activities of daily living above a predetermined quantitative value.

A further aspect of the invention provides a method comprising: connecting with a plurality of sensors in a predefined physical space; inputting to at least one processor a set of rules, wherein the rules associate particular sensors within the plurality of sensors with tasks associated with a plurality of activities of individuals within the predefined physical space, wherein the activities are monitored by the sensors; assigning a quantitative utility value to each of the activities; and employing the quantitative utility value of each of the activities to determine an impact of an absence of each sensor relative to: accuracy in monitoring one or more of the activities; and the quantitative utility value of one or more of the activities; and thereupon designating one or more sensors for replication.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Figure 1:
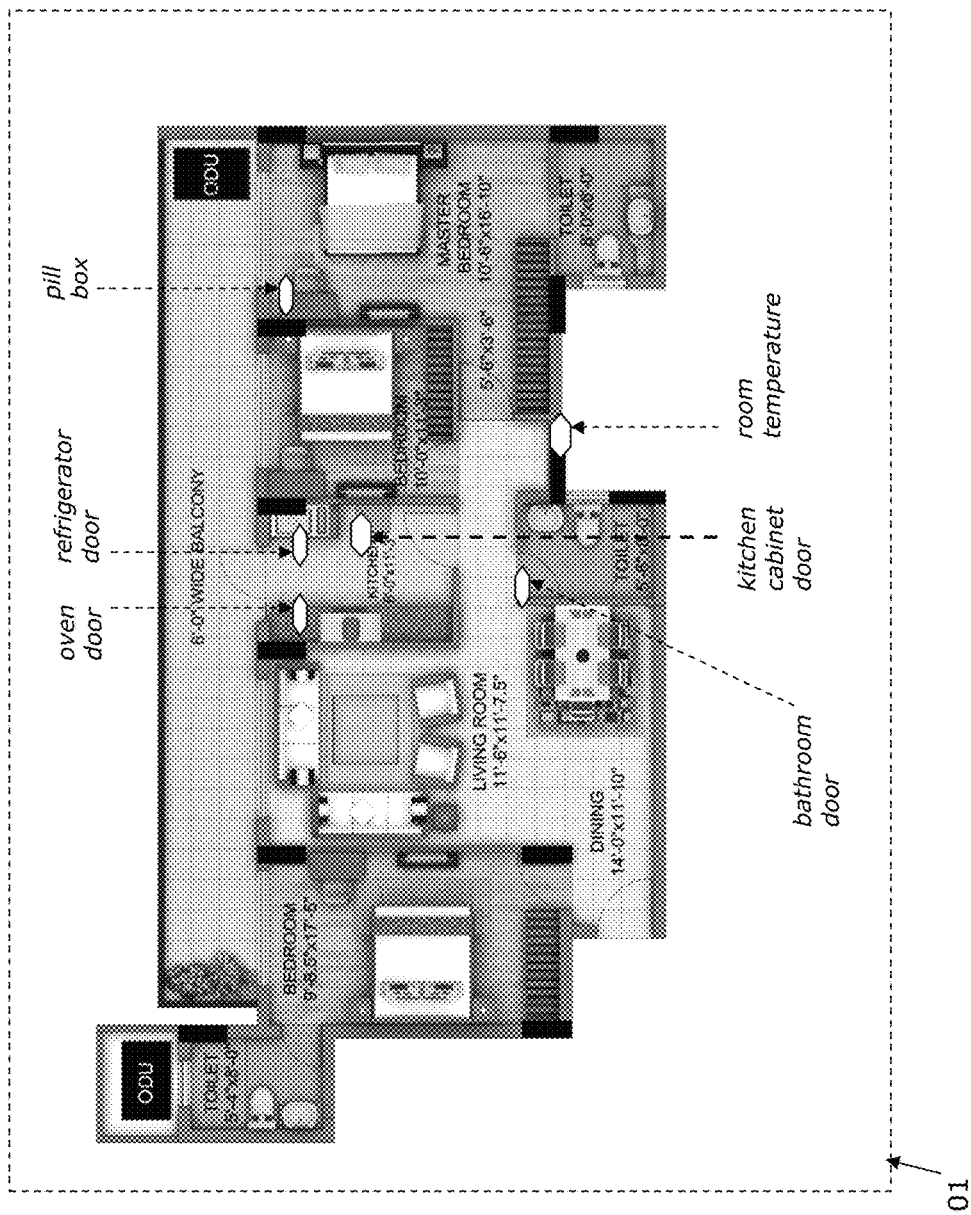
FIG. 1 provides a plan view of an apartment with several IOT sensors disposed therein.

Specific reference will now be made here below to FIG. 1. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an exemplary embodiment, most if not all of the process steps, components and outputs discussed with respect to FIG. 1 can be performed or utilized by way of a processing unit or units and system memory such as those indicated, respectively, at 16' and 28' in FIG. 3, whether on a server computer, a client computer, a node computer in a distributed network, or any combination thereof.

As generally understood herein, in accordance with at least one embodiment of the invention, ADLs can represent activities performed in a normal course of everyday life. Among other scenarios, if an individual is unable to perform such activities, he or she may need help in order to cope. Examples of activities of daily living include bathing or washing, dressing, grooming, oral care, toileting, walking, climbing stairs, eating or feeding, shopping, cooking, managing medications, using the phone, housework, doing laundry, driving, managing finances, etc. As such, ADLs can be thought of as being composed of distinct tasks. For example, the tasks of opening and closing the refrigerator door and opening, closing, and starting a microwave oven within a particular time frame can be indicative of an ADL of cooking.

As generally understood herein, in accordance with at least one embodiment of the invention, sensors may be utilized to determine whether someone has engaged in performing distinct tasks as noted above. Then, depending on the tasks performed, a conclusion may be reached as to whether someone has actually performed a particular ADL. Certain sensors, however, may be more crucial than others in determining whether or not a particular ADL is being performed. Depending on a desired capability to monitor whether a particular ADL is being performed, it may be desirable to have redundant (or extra) sensors or systems of a given type in place to ensure the ability to monitor performance. One non-limiting example of such an ADL, for which a capability to monitor performance may be important, is the taking (or managing) of medications. ADLs for which assurance of monitoring is desirable may vary from person to person depending on the person's individual circumstances and requirements.

Broadly contemplated herein, in accordance with at least one embodiment of the invention, are methods and arrangements for reducing maintenance overheads and costs of IOT sensors in smart environments by predicting the impact of losing a sensor based on accuracy in recognizing one or more types of activity, thereby determining the loss in utility caused by losing a sensor. This can involve identifying sensors to be replicated based on one or more of: the importance of the sensors as determined by the loss in utility if they malfunction; and domain-dependent or business-driven policies, e.g., maximization of utility while keeping deployment costs within a given budget, or minimizing deployment cost while maintaining utility above a chosen threshold.

The features discussed above, and others, relating to at least one embodiment of the invention, will be better appreciated from the discussion which follows.

In accordance with at least one embodiment of the invention, in an internet of things (IOT) setting, measurements are taken by several sensors, possibly in conjunction with one or more devices (e.g., household appliances). Related data may then be sent to a central repository for processing; alternatively, via an arrangement of communication between connected devices, a model may be developed via processors and/or data storage associated with one or more devices or even sensors. Generally, each sensor may undertake observations of ambient conditions, or conditions related to devices, in a manner of passive participation, i.e., passively "listening" for data/information being furnished from a device or from elsewhere in the surrounding environment. In one or more embodiments of the invention, data so gathered may be used to create a catalog comprising a collection of such data; this catalog may then be accessed at any suitable time to perform calculations (e.g., at a local or remote data processing location) towards one or more objectives as discussed or broadly contemplated herein.

As noted above, in accordance with a general background relative to at least one embodiment of the invention, IOT sensors and other components have become beneficial, among other things, for monitoring ADLs on the part of individuals for whom such monitoring may be helpful. Thus, in what is a smart environment to start, data can be captured from variously placed IOT sensors (e.g., a dry/wet area sensor, or contact sensors for doors on microwaves, kitchen cabinets, a pantry, etc.) that are then mined, to identify, recognize and track ADLs. If ADL detection is then provided as a scalable managed service, such detection can impart indicators of an individual's general well being. For instance, to the extent that ADLs are tracked, e.g., their frequency, number of occurrences or differences in patterns, a care provider can interpret what is going on with the individuals involved. This may be of benefit, e.g., with respect to post-operative patients, individuals suffering from dementia and/or Alzheimer's Disease, and older individuals or others who may otherwise present or possess issues of limited mobility. ADLs, as broadly understood herein, can include essentially any activities that are discernable from IOT sensors, such as cooking, eating, personal hygiene (washing/showering, etc.), and general mobility from one location to another within a defined space (e.g., between rooms of an individual apartment). Merely by way of illustrative example, FIG. 1 provides a plan view of an apartment (101) with several IOT sensors disposed therein (shown here as white hexagons), including ones for: an oven door, a refrigerator door, a kitchen cabinet door, a pill box, a bathroom door and room temperature sensing.

In accordance with at least one embodiment of the invention, it is generally understood that ADLs are inferred from activation or other prompting from one or more IOT sensors. While general rules can be developed or applied for such inference, they can also be customized for a given location or individual. Such customized rules could be developed in advance, and/or could be learned or iterated once observations and data return from actual monitoring. By way of illustrative example, such rules could include:

opening/closing of a refrigerator door and of a kitchen cabinet, each a given number of times for over 5 minutes, indicates grocery storage;

opening/closing of a refrigerator door and of a kitchen cabinet, each a given number of times within less than 3 minutes, indicates obtaining something to drink from the refrigerator; and opening/closing of a refrigerator door and of a convention oven door or microwave door, each a given number of times over about 20 minutes, indicates cooking;

In accordance with at least one embodiment of the invention, it is understood that sensor failure can have a critical impact on monitoring ADLs as discussed above. In this vein, it can be noted that not all ADLs need be regarded as equally important for detection in general, nor for specific needs as may impact one or more individuals. Thus, sensors from which an ADL such as (general) ambulation can be discerned may be more important relative to an individual with severe arthritis, while sensors from which ADLs such as cooking and showering can be discerned may be more important relative to an individual with dementia. Questions and considerations such as these can become important when aiming to determine which sensor(s) in an IOT setting may be more important or critical to replicate than others, or which may be more "expendable" or less important. For those more important or critical, it may be possible or desirable to install or provide two or more sensors in (or for) one location such that one or more may still function if another fails. However, it then becomes an issue to assign relative importance or criticality to sensors (or locations), as such may not be fully apparent from a purely qualitative reckoning.

At least in view of the foregoing, in accordance with at least one embodiment of the invention, methods and arrangements are broadly contemplated herein whereby the relative importance of a sensor, in an IOT setting, is estimated (e.g., via learning) relative to ADLs that may prevail in that setting. Thus, utility or importance of a sensor is defined in terms of ADLs rather than in terms of a sensor itself. Accordingly, via the estimating and learning just mentioned, additional sensors can be deployed to maximize utility, relative to the ADLs that may prevail in a given IOT setting. To this end, a given number of sensors may simply be installed or deployed at a given location in view of the utility/importance that is estimated or learnt but, alternatively, additional sensors may merely be provided to an end user if do-it-yourself installation of the same is viable.

In accordance with at least one embodiment of the invention, sensor impact analysis may be undertaken such that, given a set of ADL rules, the impact of losing a sensor can be predicted relative to one or more ADLs. To this end, an analytical model may be derived on the basis of a distribution of sensors across ADLs. As such, for each ADL, a user may assign a utility based on the needs or constraints of the user (e.g., which may relate to health care needs). The overall utility of the ADL recognition system may then be computed relative to prospective sensor loss, factoring both sensor impact analysis and the utility of ADLs affected by loss of a given sensor. Further, sensors for replication can be identified such that utility above a predetermined threshold is maintained, while minimizing a cost of deployment of newly added sensors.

In accordance with at least one embodiment of the invention, sensor impact analysis can be undertaken such that, for each ADL, when a sensor is lost, there is determined the property of ADL instances that can be detected solely by the remaining set of sensors. Thus, for "breakfast instances", or ADLs that involve an individual preparing breakfast, the loss of a refrigerator sensor might impact only those instances that are not accounted for by detection of grocery storing or handling of plates in a cupboard. Mathematically, if $R_k$ represents a set of sensors which detect one or more given ADLs ($ADL_k$), then on prospectively losing a sensor $S_i$:

$$\text{loss}(S_i, ADL_k) = |S_i \text{ only}| + \Sigma(1 - \text{confidence}_j)|j|$$

where $j \in \text{power\_set}(R_k - S_i)$; and $$\text{impact}(S_i, ADL_k) = P(S_i | ADL_k) * \text{loss}(S_i, ADL_k)$$

Further, speaking generally, temporal-based analysis can be applied such that (relative to a time factor T):

$$\text{impact}(S_i, ADL_k, T) = \text{proportion } |ADL_k, T| \text{ impact}(S_i, ADL_k)$$

In accordance with at least one embodiment of the invention, the ADL utility analysis relative to sensors, as discussed heretofore, may be expressed mathematically as follows. Each single $ADL_i$ has a utility $U_i$. Thus, losing a sensor $S_j$ that is used in detecting $ADL_i$ affects utility as follows:

$$\Delta U(i,j) = U_i * \text{impact}(S_j, ADL_i) * P_{loss}(S_j)$$

Thus, a change in utility due to losing $S_j$ may be expressed as follows:

$$\Delta U(S_j) = f(\Delta U(i,j))$$

By way of one example, the function $f$ may be represented by $\Sigma_i \Delta U(i,j)$. By way of another example, the function $f$ may be represented by $\max(\Delta U(i,j))$. Accordingly, given a threshold utility $U_{threshold}$, and current utility $U_{current}$:

if $U_{current} - \Delta U(S_j) < U_{threshold}$, then there is a need to replicate sensors as $\Delta U(S < U_{threshold}$ discussed heretofore; but if $U_{current} - \Delta U(S_j) \geq U_{threshold}$, no action of sensor replication is required.

By way of a specific working example, in accordance with at least one embodiment of the invention, assume that a patient is suffering from Alzheimer's disease, and the doctor wants to monitor the patient's regular medicine intake; thus, an item of high criticality. Similarly, the patient's relatives want to monitor whether the patient regularly does laundry, which may be regarded as an item of low criticality. Assume $U_{threshold} = 50$. In this setting, $U = \{U_{medicine\_intake} = 100, U_{laundry} = 1\}$. Furthermore, let it be assumed that there is only one sensor each for detecting the associated ADLs, e.g., a pill box sensor for medicine intake and a laundry room light sensor for doing laundry. Therefore:

$$\text{loss}(\text{pill\_box}, \text{medicine\_intake}) = \text{loss}(\text{laundry\_light}, \text{laundry}) = 1$$

$$\Delta(\text{pill\_box}, \text{medicine\_intake}) = 100 * 1 = 100$$

$$\Delta(\text{laundry\_light}, \text{laundry}) = 1 * 1 = 1$$

Clearly, losing the pill box sensor represents a much higher utility loss compared to losing the laundry room light sensor. Accordingly, to maintain $U_{current} \geq U_{threshold}$, the pill box sensor should be replicated.

In accordance with at least one embodiment of the invention, by way of developing recommendations for sensor replication, given a budget $C_{budget}$ and sensor $S_j$ costing $C_j$ for deployment, the task is to identify a set of sensors that must be replicated so as to maintain current utility above $U_{threshold}$ in the face of sensor failures. Assume equal probability failure for all sensors. Thus, the determination becomes:

Add a set of sensors $S_{i \ldots k}$ such that
$\max(\Delta_{replicate}) = (\Sigma \Delta U(i))$, with the constraints:
$\Sigma C_i \leq C_{budget}$ and $$U_{current} - \Delta(S_{missing}) + \Delta_{replicate} > U_{threshold}.$$

It will be appreciated that once such a determination is made, a much more efficient and cost-effective manner of sensor replication will be provided than otherwise may have been attainable.

It can be appreciated from the foregoing that, in accordance with at least one embodiment of invention, a technical improvement is represented at least via reducing maintenance overheads and costs of IOT sensors in smart environments by predicting the impact of losing a sensor based on accuracy in recognizing one or more types of activity, thereby determining the loss in utility caused by losing a sensor.

In accordance with at least one embodiment of the invention, very generally, quantitative values as determined herein, or other data or information as used or created herein, can be stored in memory or displayed to a user on a screen, as might fit the needs of one or more users.

Figure 2:
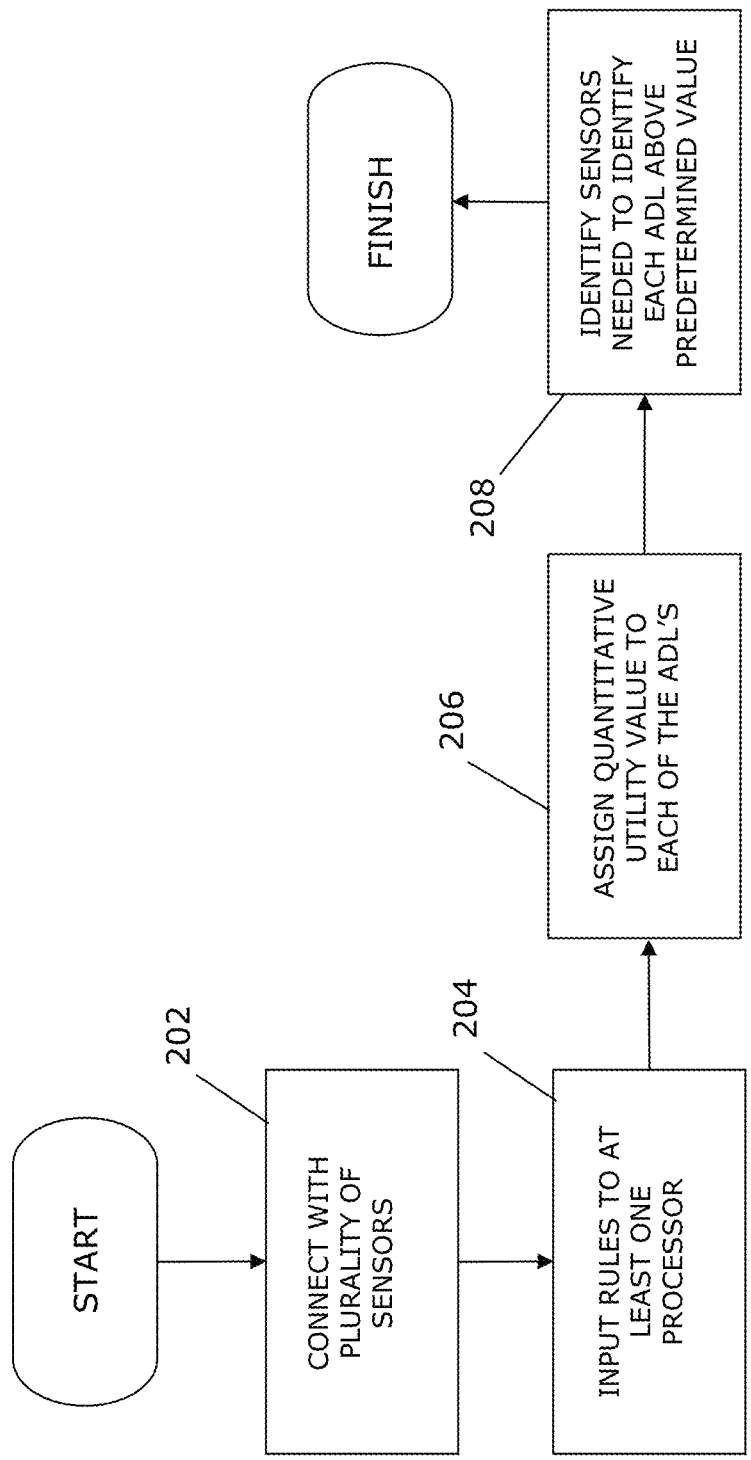
FIG. 2 sets forth a process more generally for managing sensor deployment in an internet of things.

FIG. 2 sets forth a process more generally for managing sensor deployment in an internet of things, in accordance with at least one embodiment of the invention. It should be appreciated that a process such as that broadly illustrated in FIG. 2 can be carried out on essentially any suitable computer system or set of computer systems, which may, by way of an illustrative and non-restrictive example, include a system such as that indicated at 12' in FIG. 3. In accordance with an example embodiment, most if not all of the process steps discussed with respect to FIG. 2 can be performed by way of a processing unit or units and system memory such as those indicated, respectively, at 16' and 28' in FIG. 3.

As shown in FIG. 2, in accordance with at least one embodiment of the invention, a plurality of sensors are connected with (202). A set of rules are inputted to at least one processor, wherein the rules associate particular sensors within the plurality of sensors with tasks associated with a plurality of activities of daily living (204). A quantitative utility value is assigned to each of the activities of daily living within the plurality of activities of daily living (206). The quantitative utility value of each of the activities of daily living and the tasks associated with the activities of daily living are utilized to identify those sensors within the plurality of sensors needed to identify each of the activities of daily living above a predetermined quantitative value (208).

Figure 3:
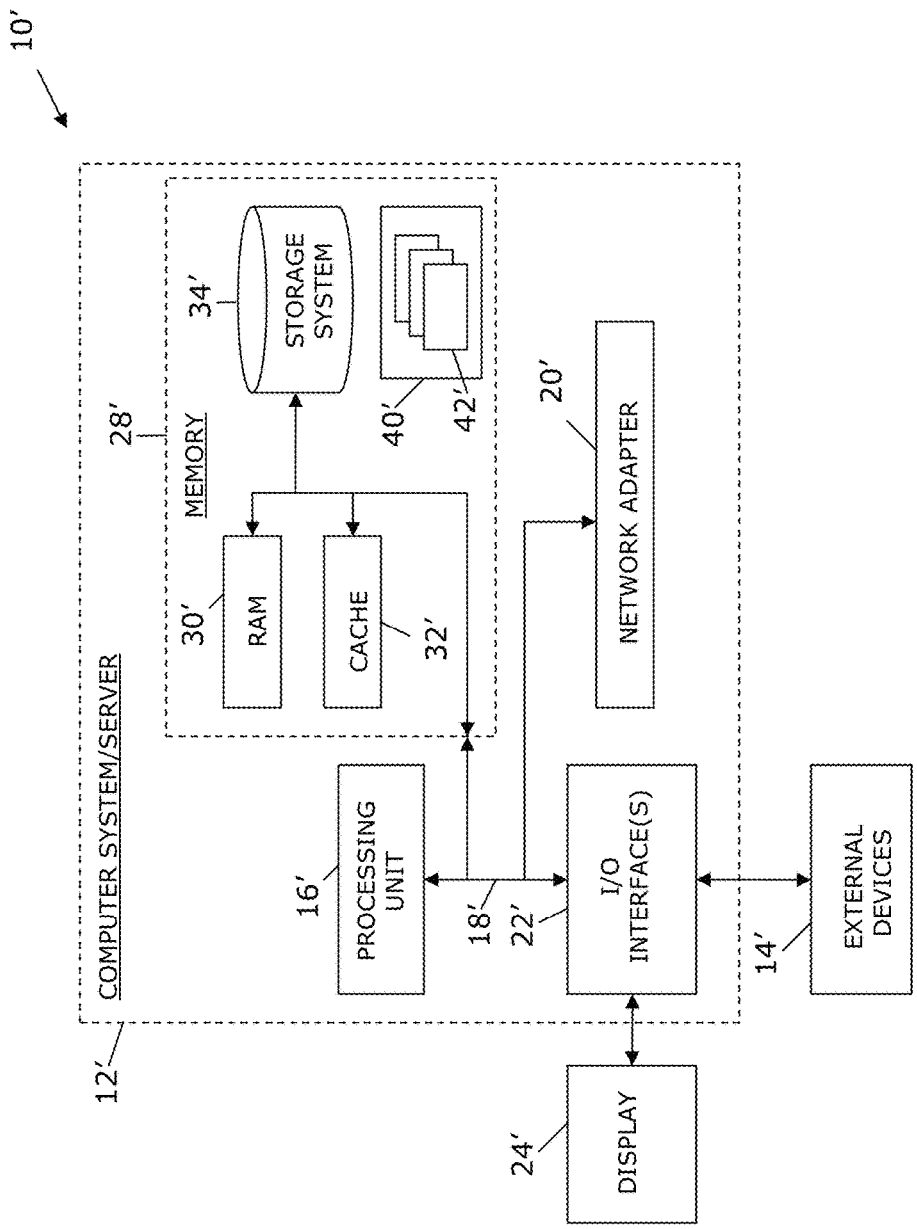
FIG. 3 illustrates a computer system.

Referring now to FIG. 3, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of determining a need for sensors, said method comprising:
   utilizing at least one processor to execute computer code that performs the steps of:
   connecting with a plurality of sensors dispersed in a predetermined space;
   identifying, using the plurality of sensors, one or more activities of daily living engaged in by a user, wherein the identifying comprises recognizing an occurrence of at least one user-performed event and comparing the recognition of the at least one user-performed event to a database comprising relationships between user-performed events and activities of daily living;
   determining impact of an absence of each of the plurality of sensors relative to accuracy in recognizing one or more of the activities of daily living, wherein the determining comprises assigning a quantitative utility value to each of the plurality of sensors associated with a particular activity of daily living, the quantitative utility value signifying an importance of the presence of each of the plurality of sensors in recognition of the one or more activities of daily living; and
   employing the quantitative utility value to identify those sensors within the plurality of sensors needed to identify each of the activities of daily living above a predetermined quantitative value.

2. The method according to claim 1, wherein said employing comprises designating one or more sensors for replication.

3. The method according to claim 2, wherein said employing comprises determining an effect of an absence of a sensor on the quantitative utility value of one or more of the activities of daily living.

4. The method according to claim 3, wherein said employing comprises determining whether the quantitative utility value of one or more of the activities of daily living goes below a predetermined threshold value in the absence of a sensor.

5. The method according to claim 4, wherein said employing comprises determining a loss in quantitative utility value corresponding to absence of a sensor, and then determining whether the quantitative utility value of one or more of the activities of daily living goes below the predetermined threshold value when subtracting the loss in quantitative utility value corresponding to the absence of a sensor.

6. The method according to claim 5, wherein the loss in quantitative utility value corresponding to absence of a sensor is a function of a summation in changes in quantitative utility values.

7. The method according to claim 5, wherein the loss in quantitative utility value corresponding to absence of a sensor is a function of a maximum among changes in quantitative utility values.

8. The method according to claim 2, wherein said employing comprises applying at least one budget constraint.

9. An apparatus for determining a need for sensors, said apparatus comprising:
   at least one processor; and
   a computer readable storage medium having computer readable program code embodied therewith and executable by the at least one processor, the computer readable program code comprising:
   computer readable program code that connects with a plurality of sensors dispersed in a predetermined space;
   computer readable program code that identifies using the plurality of sensors, one or more activities of daily living engaged in by a user, wherein the identifying comprises recognizing an occurrence of at least one user-performed event and comparing the recognition of the at least one user-performed event to a database comprising relationships between user-performed events and activities of daily living;
   computer readable program code that determines impact of an absence of each of the plurality of sensors relative to accuracy in recognizing one or more of the activities of daily living, wherein the determining comprises assigning a quantitative utility value to each of the plurality of sensors associated with a particular activity of daily living, the quantitative utility value signifying an importance of the presence of each of the plurality of sensors in recognition of the one or more activities of daily living; and
   computer readable program code that employs the quantitative utility value to identify those sensors within the plurality of sensors needed to identify each of the activities of daily living above a predetermined quantitative value.

10. A computer program product for identifying sensors deployed in an internet of things to assist in determining a need for sensors, said computer program product comprising:

a computer readable storage medium having computer readable program code embodied therewith, the computer readable program code comprising:

computer readable program code that connects with a plurality of sensors dispersed in a predetermined space;

computer readable program code that identifies using the plurality of sensors, one or more activities of daily living engaged in by a user, wherein the identifying comprises recognizing an occurrence of at least one user-performed event and comparing the recognition of the at least one user-performed event to a database comprising relationships between user-performed events and activities of daily living;

computer readable program code that determines impact of an absence of each of the plurality of sensors relative to accuracy in recognizing one or more of the activities of daily living, wherein the determining comprises assigning a quantitative utility value to each of the plurality of sensors associated with a particular activity of daily living, the quantitative utility value signifying an importance of the presence of each of the plurality of sensors in recognition of the one or more activities of daily living; and computer readable program code that employs the quantitative utility value to identify those sensors within the plurality of sensors needed to identify each of the activities of daily living above a predetermined quantitative value.

11. The computer program product according to claim 10, wherein the employing comprises designating one or more sensors for replication.

12. The computer program product according to claim 11, wherein the employing comprises determining an effect of an absence of a sensor on the quantitative utility value of one or more of the activities of daily living.

13. The computer program product according to claim 12, wherein the employing comprises determining whether the quantitative utility value of one or more of the activities of daily living goes below a predetermined threshold value in the absence of a sensor.

14. The computer program product according to claim 13, wherein the employing comprises determining a loss in quantitative utility value corresponding to absence of a sensor, and then determining whether the quantitative utility value of one or more of the activities of daily living goes below the predetermined threshold value when subtracting the loss in quantitative utility value corresponding to the absence of a sensor.

15. The computer program product according to claim 14, wherein the loss in quantitative utility value corresponding to absence of a sensor is a function of a summation in changes in quantitative utility values.

16. The computer program product according to claim 14, wherein the loss in quantitative utility value corresponding to absence of a sensor is a function of a maximum among changes in quantitative utility values.

17. The computer program product according to claim 11, wherein the employing comprises applying at least one budget constraint.

* * * * *